No. 832,957. PATENTED OCT. 9, 1906.
H. M. CHISHOLM.
PEA HARVESTER.
APPLICATION FILED JAN. 27, 1906.
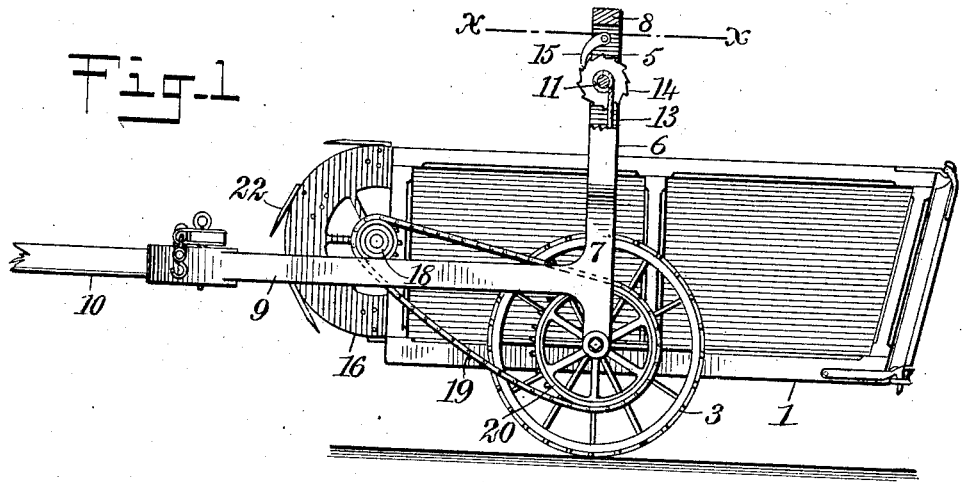
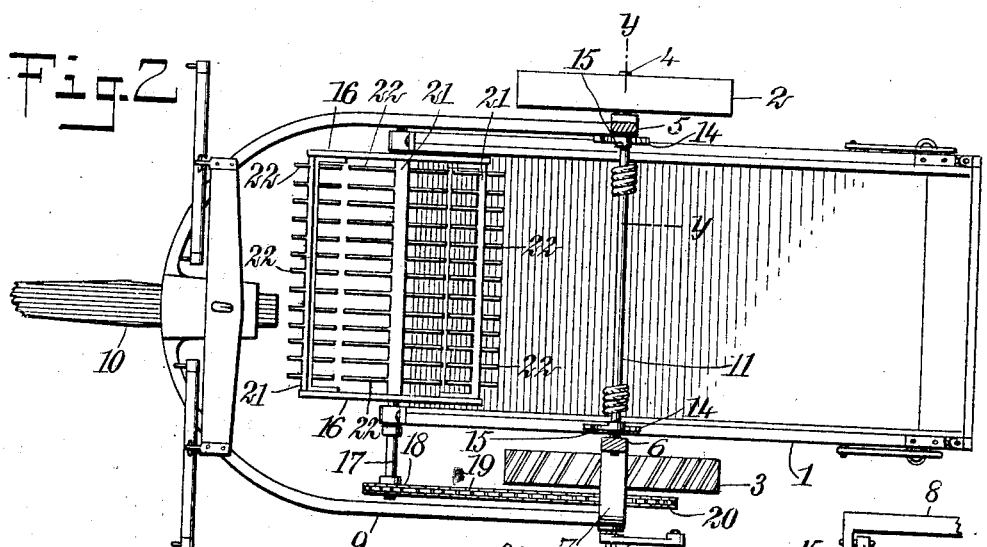
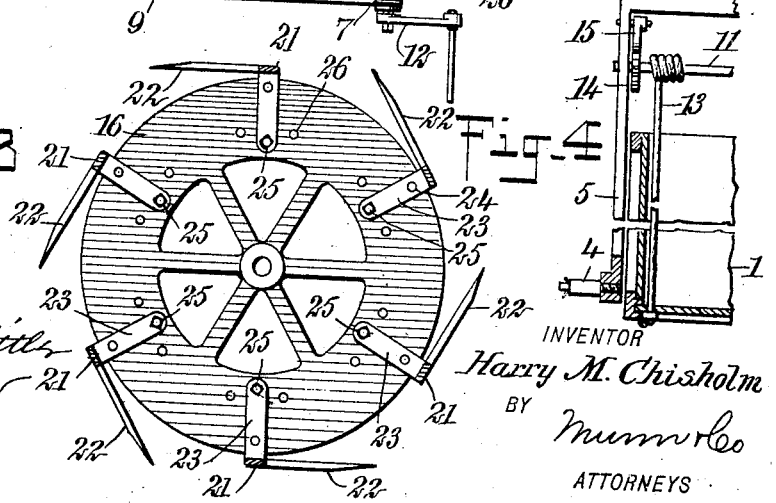
WITNESSES:
INVENTOR
Harry M. Chisholm
BY
Munn & Co
ATTORNEYS
THE NORRIS PETERS CO., WASHINGTON, D. C.

UNITED STATES PATENT OFFICE.

HARRY MORTIMER CHISHOLM, OF BYRON, GEORGIA.

PEA-HARVESTER.

No. 832,957.	Specification of Letters Patent.	Patented Oct. 9, 1906.

Application filed January 27, 1906. Serial No. 298,171.

*To all whom it may concern:*

Be it known that I, HARRY MORTIMER CHISHOLM, a citizen of the United States, and a resident of Byron, in the county of Houston and State of Georgia, have invented a new and Improved Pea-Harvester, of which the following is a full, clear, and exact description.

This invention relates to improvements in machines for harvesting cow-peas, the object being to provide a machine for this purpose that will be simple in construction and by means of which the harvesting may be readily carried on.

I will describe a pea-harvester embodying my invention and then point out the novel features in the appended claims.

Reference is to be had to the accompanying drawings, forming a part of this specification, in which similar characters of reference indicate corresponding parts in all the figures.

Figure 1 is a side elevation of a pea-harvester embodying my invention. Fig. 2 is a plan thereof, partly in section, on the line $x\,x$ of Fig. 1. Fig. 3 is a cross-section through the stripper, and Fig. 4 is a section on the line $y\,y$ of Fig. 2.

The machine comprises a box-like body 1, mounted on wheels 2 3, the wheel 2 is mounted on a stud 4, connected to an upright 5, while the wheel 3 is mounted on a shaft or stud supported at one end by an upright 6 and depending member 7. The uprights 5 and 6 are connected at the top by a cross-bar 8, and extended forward from the lower portions of the uprights is a frame 9, to which the draft-tongue 10 is attached. The uprights 5 and 6, the cross-bar 8, and the frame 9 practically form a single frame. Having bearings in the upper portion of the uprights 5 6 is a shaft 11, one end of which is made angular to engage in a crank 12, and from this shaft 11 ropes or chains 13 extend downward and connect with the bottom of the body 1. At the ends of the shaft 11 are ratchet-wheels 14, engaged by pawls 15, the said ratchet-wheels and pawls being designed to hold the body in its vertically-adjusted position.

The front end of the body 1 is open, and arranged in the open end is a stripper, comprising heads 16, mounted on a shaft 17, on which is a sprocket-pinion 18, from which a chain 19 extends to connection with a sprocket-wheel 20 on the shaft of the wheel 3. Connected to the heads 16 are cross-bars 21, to which are attached teeth 22, the said teeth being arranged at substantially right angles to the radii of the stripper-cylinder; but the angle may be adjusted as the bars 21 are connected to arms 23, which have pivotal connection 24 with the heads 16, and the inner ends of said arms are held in engagement with the heads by means of bolts 25, which pass through perforations in said heads. It will be noted in Fig. 3 that for the purpose of adjustment as to angle of the teeth a plurality of perforations 26 is formed adjacent to each arm. While I have shown six bars 21, it is obvious that any desired number may be employed and also that any desired number of teeth on each bar may be formed without departing from the spirit of my invention.

In operation as the machine is drawn forward the stripper will be rotated, removing the pea-pods from the vines and depositing the pods into the body of the machine; and, as before stated, the body of the machine may be readily regulated or adjusted as to height from the ground.

Having thus described my invention, I claim as new and desire to secure by Letters Patent—

1. In a harvester, a wheel-mounted body, the said body being open at the front, and a rotary stripper at the open end, said stripper being substantially in the form of a cylinder and comprising a shaft, heads mounted on the shaft, bars having arms pivotally connected to the heads and perforated, the heads also having a plurality of perforations adjacent to the arms, bolts for passing through the arm-perforations, and into perforations in the heads, and teeth mounted on the said bars and extended at substantially right angles to the radii of the stripper-cylinder.

2. A pea-harvester comprising a wheel-mounted body, the said body having an open front end, a shaft at the front end, a driving connection between the shaft and one of the wheels of the machine, heads on said shaft, bars connecting with the heads mounted on pivots and adjustable thereon, and teeth attached to the bars.

In testimony whereof I have signed my name to this specification in the presence of two subscribing witnesses.

HARRY MORTIMER CHISHOLM.

Witnesses:
A. C. WALTON,
J. E. GRAVES.